United States Patent [19]

Noguchi et al.

[11] Patent Number: 4,721,253

[45] Date of Patent: * Jan. 26, 1988

[54] INTERMITTENT TYPE SWIRL INJECTION NOZZLE

[75] Inventors: Masaaki Noguchi; Masaharu Sumiyoshi; Yujiro Oshima; Masatoshi Yamada, all of Aichi, Japan

[73] Assignee: Kabushiki Kaisha Toyota Chuo Kenkyusho, Aichi, Japan

[ * ] Notice: The portion of the term of this patent subsequent to Dec. 16, 2003 has been disclaimed.

[21] Appl. No.: 784,062

[22] Filed: Oct. 4, 1985

[30] Foreign Application Priority Data

Nov. 14, 1984 [JP] Japan ................... 59-241483

[51] Int. Cl.$^4$ ................ B05B 1/30; F02M 47/00
[52] U.S. Cl. ................... 239/464; 239/472; 239/489; 239/533.12
[58] Field of Search ........ 239/464, 468, 472, 487–489, 239/533.3–533.12, 584, 585

[56] References Cited

U.S. PATENT DOCUMENTS

| | | | |
|---|---|---|---|
| 1,252,254 | 1/1918 | Fisher | 239/584 |
| 1,952,816 | 3/1934 | Mock | 239/488 |
| 2,613,998 | 10/1952 | Noon et al. | 239/464 |
| 3,531,052 | 9/1970 | Berlyn | 239/533.7 |
| 3,838,821 | 10/1974 | Berlyn | 239/533.7 |
| 4,179,069 | 12/1979 | Knapp et al. | 239/585 |
| 4,192,466 | 3/1980 | Tanasawa et al. | 239/464 |
| 4,230,273 | 10/1980 | Claxton et al. | 239/489 |
| 4,365,746 | 12/1982 | Tanasawa et al. | 239/533.12 |
| 4,629,127 | 12/1986 | Kawamura et al. | 239/489 |

FOREIGN PATENT DOCUMENTS

| | | | |
|---|---|---|---|
| 1086948 | 8/1960 | Fed. Rep. of Germany . | |
| 3432663 | 3/1985 | Fed. Rep. of Germany . | |
| 591421 | 4/1959 | Italy | 239/533.4 |
| 868093 | 5/1961 | United Kingdom . | |

Primary Examiner—Andres Kashnikow
Assistant Examiner—Michael J. Forman
Attorney, Agent, or Firm—Sughrue, Mion, Zinn, Macpeak & Seas

[57] ABSTRACT

An intermittent type swirl injection nozzle providing substantially improved spray characteristics while being easy to manufacture and install. The nozzle includes a nozzle body and a needle valve slidably disposed in a guide hole of the nozzle body with a spray hole communicating a body seat formed inside the nozzle body and the forward end of the needle valve. A swirl passage is provided around the needle valve for giving a swirl flow influence around the axis of the needle valve to fuel when the needle valve is lifted from the body seat. A straight passage is provided in a portion where the inner wall of the guide hole and the needle valve make sliding contact for giving the fuel a straight flow influence in the axial direction of the needle valve. The two flows are joined prior to passing through the spray hole.

1 Claim, 12 Drawing Figures

INTERMITTENT TYPE SWIRL INJECTION NOZZLE

BACKGROUND OF THE INVENTION

The present invention relates to an intermittent type swirl injection nozzle for an internal combustion engine capable of providing a desired angle of spray divergence, penetration (reach) of the spray, and fuel atomization by providing both swirling and straight flows in fuel flow passages through an injection nozzle. The invention further relates to such an injection nozzle in which the flows can be controlled in swirling and straight directions.

In stratified charge engines and Diesel engines wherein fuel is injected into combustion chambers of the engine, the fuel injection system has had to meet increasingly stringent requirements of combustion efficiency and performance. To achieve the best performance of an engine over a wide range of operating conditions relative to engine speed and loads, there is required a fuel injection system which is adaptable for all operating conditions.

A fuel injection system for a Diesel engine includes as primary components a fuel pump, connecting pipes and fuel injection nozzles. Of these, it is well known that the spray characteristics of the fuel injection nozzle particularly strongly affects the performance of the engine. The atomized fuel discharged from the fuel injection system into the combustion chamber can be made to form an optimum fuel-air mixture provided that the particle size of the spray, the angle of divergence (spray angle), the penetration of the spray, the required fuel quantity for each injection, and the like are properly determined in accordance with the flow rate of the air taken into the combustion chamber. Moreover, adaptation of injection timing, injection period and coefficient of intake air utilization are important to improve the thermal efficiency of the engine and to suppress the generation of smoke.

In order to satisfy the requirements above, it has been attempted to increase the injection pressure of the fuel, make the diameter of the nozzle hole as small as possible, and provide a plurality of nozzle holes. Moreover, attempts have been taken to redesign the shapes of the pintle and the throttle valve and implement the valve lift control, including adopting a plurality of injection nozzles. However, with the use of conventional swirl type injection nozzles, it is not always possible to ensure satisfactory fuel atomization, the desired angle of spray divergence, and the desired penetration of fuel particles. In addition, such a conventional injection nozzle is complicated in construction and is expensive.

SUMMARY OF THE INVENTION

Taking the above-described circumstances into account, it is therefore an object of the present invention to provide an intermittent type swirl injection nozzle capable of providing a desired spray particle size, a desired angle of spray divergence, and a desired penetration of the spray, wherein each of these factors can be controlled in accordance with various internal combustion engine operating conditions.

It is another object of the present invention to provide a high-performance intermittent type swirl injection nozzle simple in construction and capable of being easily manufactured and assembled, which provides uniform accuracy, and which offers excellent atomizing characteristics.

In accordance with the above and other objects, the invention provides a swirl injection nozzle comprising a needle valve slidably received in a guide hole in a nozzle body, a spray hole communicating with the body seat where the leading end of the needle valve contacts the inner wall of the guide hole, a swirl passage provided around the axis of the needle valve for giving a swirl fuel flow influence around the axis of the valve needle when the needle is lifted from the body seat in the guide hole to open the nozzle, and a straight passage provided in the portion where the inner wall of the guide hole and the needle valve slidably contact for giving a straight fuel flow influence in the axial direction of the needle valve. After being joined, the two fuel flows are sprayed in conical form through the spray hole.

With the inventive swirl injection nozzle, desired spray characteristics are obtained by making the fuel flows energized in the swirl and straight directions fit for the adaptive flow rate. These characteristics including the angle of divergence, the degree of atomization, and the penetration of the fuel spray, are affected by the way in which the respective passages are formed. To date, in a swirl injection nozzle, there have been no known studies relating to the swirl and straight flow influences to the spray.

More specifically, the inventors have conducted detailed investigations of the aforementioned problems and succeeded in providing a swirl injection nozzle based on a unique concept of providing passages designed to meet a wide range of engine requirements.

Given that the flow rate of the fuel injected from the spray hole is expressed by $Q_3$, the flow rates of the fuel flowing through the straight and swirl passages respectively by $Q_2$ and $Q_1$, the fuel pressure in the swirl chamber by $P_2$ and fuel pressure at the valve inlet by $P_1$, the relation between the flow rates and pressures is represented by the following equation:

$$Q_1 = K_1 \sqrt{2/\rho(P_1 - P_2)},$$

$$Q_2 = K_2 \sqrt{2/\rho(P_1 - P_2)},$$

$$Q_3 = K_3 \sqrt{2/\rho P_2}, \text{ and}$$

where $K_1$, $K_2$ and $K_3$ are effective flow areas in the respective swirl and straight passages and the passage of the spray hole, and is the fuel density. Since the swirled fuel flow (of flow rate $Q_1$) and the straight fuel flow (of flow rate $Q_2$) are joined together in the swirl chamber and injected through the spray hole:

$$Q_3 = Q_1 + Q_2.$$

Accordingly, the relation of the effective passage area to the injection pressure is given by:

$$(K_1 + K_2)/K_3 = \sqrt{P_2/(P_1 - P_2)} = \sqrt{(P_2/P_1)/\{1 - (P_2/P_1)\}}.$$

FIG. 1 illustrates this relation.

Given that, in the swirl passage, the straight passage, and the passage of the spray hole that $K_1 = K_3$ and $K_2=0$ (or $K_1=K_2=\frac{1}{2}K_3$, etc.), $(K_1+K_2)/K_3=1$, according to the equation above, $P_2/P_2$ is equal to 0.5. That is, due to the resistance in the swirl and straight passages, the fuel injection pressure $P_2$ is half the oil pressure $P_1$ applied by the pump. In other words, the oil pressure applied by the pump has to be more than twice as high as the valve opening pressure required to lift the needle nozzle. Consequently, the amplified oil pressure tends to increase the deficiency of the injection system as a whole.

As the resistance in the swirl and straight passages increases, the rise of pressure $P_2$ is weakened, and when such weakened pressure rise affects the lifting of the needle valve further, the needle valve will be lifted unsatisfactorily or the movement of the needle valve may become unstable, causing normal spraying to be impossible. As $K_1+K_2$ increases relative to $K_3$, $P_2/P_1$ approaches 1, and thus the difference in pressure between the front and rear of the swirl and straight passages ($P_1-P_2$) is decreased and hence the flow velocity of the fuel passing through the passages reduced. Accordingly, the swirling energy of the fuel passing through the swirl passage will be reduced, making it impossible to achieve the desired characteristics of the swirl injection nozzle. Thus, there exists an optimum range of $(K_1+K_2)/K_3$.

As an intermittent type swirl injection valve applicable to various internal combustion engines, the lead angles $\theta_1$ of swirl passages $K_1$, $(K_1+K_2)/K_3$, $K_1/K_2$ and $K_1$ should be properly selected in combination so as to provide a swirl injection nozzle having optimum characteristics for various types of internal combustion engines in terms of angle of spray divergence, penetration of the spray, and spray particle diameter. Moreover, to be applicable as a swirl injection nozzle for various internal combustion engines, for instances, small direct-injection Diesel engines used over a wide operating range for small motor vehicles, $K_1$, $K_2$ and $K_3$ (expressed by the cross-sectional areas of the respective passage), have to satisfy at least one of the following conditions. That is, results obtained from a number of experiments and analyses have proved that at least one of the following range requirements should be satisfied: $(K_1+K_2)/K_3$ should be within a range of 1 to 5, $K_1/K_2$ within a range of 0.2 to 2 with a value of 1 preferred, and the angle $\theta_1$ of the swirl passage of $K_1$ should be within a range of 5° to 60°. However, these optimum ranges may differ in some cases, for instance, for a large stationary (nonvehicular) Diesel engine whose operating range of r.p.m. is narrow.

The straight passage is provided between the needle valve and the inner wall of the nozzle body. Although the straight and swirl flows have been defined as being flows directed downstream through the straight and swirl passages, respectively, the energies of the straight and swirl flows are subject to variations depending on the flow direction, provided that, as shown in FIGS. 4 thorough 11, the fuel passage is allowed to communicate with the lower reach of the body seat (termed the swirl chamber) close to the leading end of the valve needle in the tangential direction relative to the valve axis and is offset therefrom. Even in this case, the fuel passage is a straight passage capable of providing the swirl energy according to the present invention. Accordingly, the passages are arranged in consideration of both the energies imparted thereto.

The intermittent type swirl injection nozzle thus constructed according to the present invention operates to create one flow energized in the swirl direction and the other energized in the straight direction which are adapted by the passages formed in the aforementioned manner so that fuel flows passed through the swirl and straight passages and joined together can be sprayed in a conical shape from the spray hole to obtain the desired spray characteristics. Moreover, the fuel passage is made to communicate with the lower reach of the body seat close to the leading end of the needle valve in the tangential direction with respect to the valve axis, and the straight to swirl energy convergence ratio is determined by properly selecting the tangential direction, whereby the fuel is sprayed from the spray hole in such a manner as to obtain the desired spray characteristics.

Thus the intermittent type swirl injection nozzle according to the present invention is capable of providing the desired spray characteristics, including the angle of spray divergence, the reach of the spray, and the degree of atomization corresponding to specified internal combustion engine operating conditions. As a result, the fuel, sprayed in a generally conical form from the intermittent type swirl injection nozzle according to the present invention, together with the intake air flow, is adaptable to pre-determined combustion chambers of various engines, and provides an excellent fuel-air mixture under a wide range of operating conditions. Accordingly, because the improved fuel spray contributes to more effective combustion, not only is there an improvement in engine output, but also reductions in the discharged smoke generation level and the fuel consumption rate, the generation of toxic components in the exhaust gas, and combustion noise.

DESCRIPTION OF THE PREFERRED EMBODIMENTS

Figure 2:
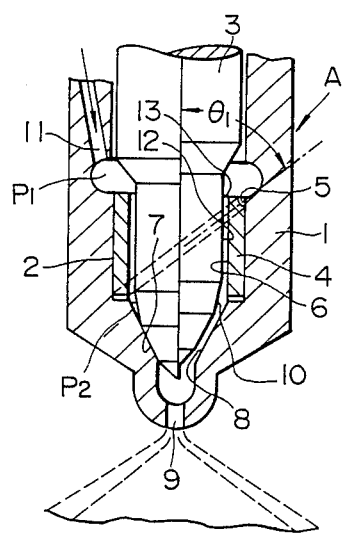
FIG. 2 is a vertical sectional cutaway view showing principal portions of a first embodiment of an intermittent swirl injection nozzle of the present invention.
Figure 1:
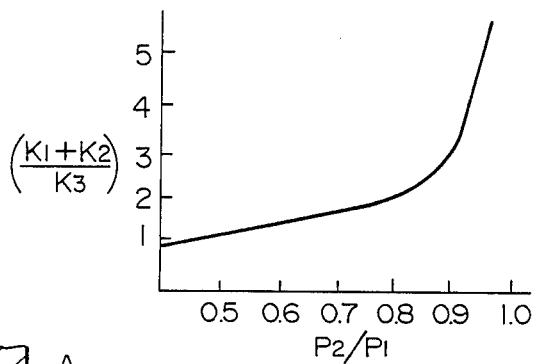
FIG. 1 is a graph representing the characteristics of an intermittent type swirl injection nozzle embodying the present invention.

Referring now to the drawings, preferred embodiments of the present invention will subsequently be described.

FIG. 2 shows a first embodiment of an intermittent type swirl injection nozzle constructed according to the present invention. This intermittent type swirl injection nozzle A has a fixed cylindrical member 4 provided between the inner wall 2 of a nozzle body 1 and the outer periphery of a needle valve 3, the cylindrical member 4 being fixed to the inner wall 2 and being provided with a tangential groove 5 at its outer surface. A guide hole 6 of the cylindrical member 4 slidably receives the valve needle 3. A coil spring (not shown) resiliently presses against the base end (rear) face of the value needle 3. A conical body seat 8 with which the conical end 7 of the valve 3 can contact is provided at the forward end of the inner wall 2. A spray hole 9 having a predetermined flow area $K_3$ is provided at the leading end of the nozzle body 1. The nozzle body 1 forms an annular swirl chamber 10 located around and close to the boundary between the cylindrical body and the conical forward end of the valve needle 3. The leading end of a supply passage 11 formed in the nozzle body 1 communicates with the swirl chamber 10 through at least one tangential groove 5, which acts as a swirl passage, provided in the outer peripheral face of the swirl chamber 10, extending in its tangential direction, and having a flow area $K_1$. With this structure, fuel is sufficiently energized in the swirl direction when passing through the tangential groove 5, whereby intense swirls are formed therein.

In this first embodiment, the needle valve 3 is lifted from the body seat 8 when urged against the above-mentioned coil spring to allow the valve to open with a rise in the pressure of the fuel supplied to the swirl chamber 10 through the fuel supply passage 11 and the tangential groove 5, whereupon the swirl chamber 10 in the fuel passage is caused to communicate with the spray hole 9 through the gap between the forward end 7 of the needle valve 3 and the body seat 8. In addition, the injection valve A has a straight passage 13 provided between the lower outer peripheral wall 12 of the valve needle 3 and the guide hole 6 of the cylindrical member 4, extending in the axial direction of the needle valve 3, and having a flow area $K_2$. Consequently, the fuel is energized generally in the straight direction, that is, in the axial direction of the needle valve 3, in the straight passage 13.

The injection nozzle A according to the first embodiment is arranged so that a generally conical spray of fuel exiting from the spray hole 9 has desired spray characteristics in view of the fact that fuel flows are energized in the tangential groove 5 and the straight passage 13 in the swirl and straight directions, respectively, and then joined in the swirl chamber 10.

It is assumed that $Q_3$ designates the fuel flow rate of fuel injected from the spray hole 9; $Q_2$, the flow rate of the fuel flowing through the straight passage 13; $Q_1$, the flow rate of the fuel flowing through the tangential groove 5; $P_1$, the fuel pressure at the valve inlet (supply oil pressure); and $P_2$, the fuel pressure in the swirl chamber 10.

In the case of the first embodiment of the invention, assuming that the conditions discussed above meet $K_1=K_3$ and $K_2=2K_3$, then $P_2/P_1$, $(K_1+K_2)/K_3$ and $K_1/K_2$ are 0.9, 3 and 0.5, respectively. Furthermore, when the angle $\theta_1$ of the tangential groove 5 with respect to the axial direction of the needle valve 3 is 10°, the values above will be within the desired ranges of $(K_1+K_2)/K_3$, $K_1/K_2$ and $\theta_1$.

Thus, in the first embodiment of the swirl injection nozzle A thus constructed, the fuel is energized by the tangential groove 5 in the swirl direction and joined to the fuel flow energized in the straight direction from the straight passage, and the joined flow is sprayed from the spray hole 9 and atomized to form a conical spray. Accordingly, the first embodiment of the injection nozzle A is capable of producing a large spray angle and excellent atomizing characteristics and short penetration as compared with a hole or throttle type nozzle.

In the above-described first embodiment, since the tangential groove 5 and the straight passage 13 are formed in respective different independent portions and the flows are prevented from interfering with each other, the spray characteristics are such that, even if the pump pressure is raised as the pump speed increases, there will occur few change in the angle of divergence of the spray (which varies with the angle of the tangential groove 5 relative to the axis of the needle valve). By using such an intermittent type swirl injection nozzle in an internal combustion engine, significant improvements of the performance of the engine are attained.

Figure 3:
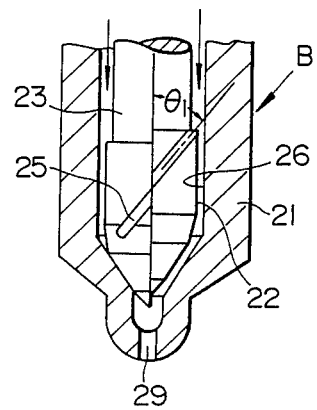
FIG. 3 is a vertical sectional cutaway view of principle portions of a second embodiment of the present invention.

Referring to FIG. 3, a second embodiment of the intermittent type swirl injection nozzle of the invention will be described.

Unlike the aforementioned first embodiment of the intermittent type swirl injection nozzle A which is of a swirler type employing the tangential groove 5 provided in the outer peripheral wall of the cylindrical member 4 for energizing the fuel supplied to the spray hole 9 in the swirling direction, the second embodiment of the intermittent type swirl injection nozzle B is of a lead groove type having at least one tangential groove 25 acting as a swirl passage (having a flow area $K_1$). The groove 25 is formed in a part of the periphery of valve needle 23 and is employed to energize the fuel supplied to a spray hole 29 in the swirl direction. Further, there is provided an annular straight passage 22 (having a flow area $K_2$) extending along the axial direction of the valve needle 23 and formed as the clearance of a guide hole 26 and the needle valve 23 are in sliding contact, the guide hole 26 being used to slidably guide the needle valve 23.

In the case of the second embodiment of the intermittent type swirl injection nozzle B, if $K_1$, $K_2$ and $K_3$, as discussed above, meet $K_1=K_2=K_3$, then $P_2/P_1$, $(K_1+K_2)/K_3$ and $K_1/K_2$ are 0.8, 2 and 1, respectively. Moreover, if the angle $\theta$ of the tangential groove 25 is 8°, the proper ranges of all of $(K_1+K_2)/K_3$, $K_1/K_2$ and $\theta_1$ will be attained. As other features of the second embodiment are generally similar to the first embodiment, a further description thereof will be omitted.

Although the second embodiment of the intermittent type swirl injection nozzle B produces generally the same effects as the first embodiment, the flow of fuel through the straight passage is affected by the flow of fuel through the swirl passage in terms of energization in the swirl direction because the swirl and straight passages are located in the same region. Consequently, as $Q_1$ and $Q_2$ increase with increasing pump pressure as the pump speed increases, the flow energized in the straight direction is affected by what is energized in the swirl direction, and thus the energization in the swirl direction will be amplified. Accordingly, the angle of divergence of the spray tends to be increased. This effect can be utilized in some cases.

Figure 4:
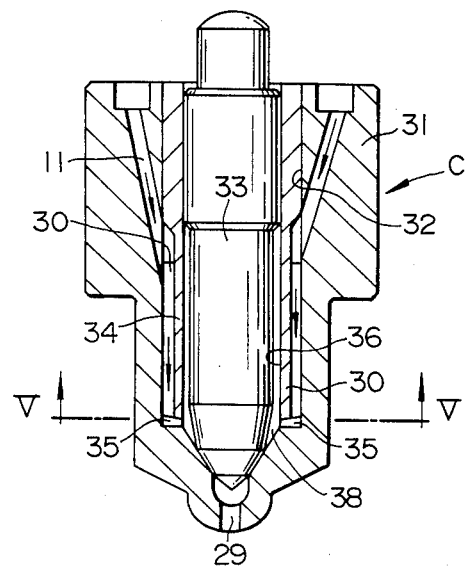
FIGS. 4 and 5 are vertical sectional cutaway and transverse sectional views, respectively, of principal portions of a third embodiment of the present invention.
Figure 5:
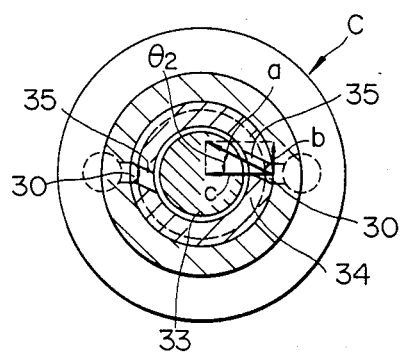

Referring to FIGS. 4 and 5, a third embodiment of an intermittent type swirl injection nozzle of the invention will be described. The third embodiment of the intermittent type swirl injection nozzle C is provided with a fixed cylindrical member 34 disposed between the inner wall 32 of a nozzle body 31 and a needle valve 33 and has at least one tangential port 35 having a predetermined flow area L. Further, there is provided a guide hole 36 for slidably guiding the needle valve 33 in the cylindrical member 34 and a fuel supply passage 30 provided between the inner wall 32 of the nozzle body 31 and the outer peripheral wall of the cylindrical member 34. The rear portion of the fuel supply passage 30 communicates with a tangential port 35, which is tilted relative to the axis of the needle valve 33, namely, tangentially at an angle of $\theta_2$ toward the outer peripheral face of a swirl chamber 38. In other words, the angle $\theta_2$ is formed by the swirl passage and a line c normal to the tangent b to the face of the swirl chamber 38 at the point where the tangential port 35 meets the swirl chamber. A tangential port 35 has a role of energizing fuel flow around the axis of the needle valve 33 in both the swirl and straight directions.

Given that the cross-sectional area of the tangential port is L, the flow rates energized in the swirl and straight directions are expressed by L·sin $\theta_2$ and L·cos $\theta_2$, respectively. Assuming that $K_1' = L \cdot \sin \theta_2$ and $K_2' = L \cdot \cos \theta_2$, $K_1'$ and $K_2'$ are equivalent to $K_1$ and $K_2$, respectively, in the first and second embodiments, and hence the ratio of $K_1$ to $K_2$ is expressed by tan $\theta_2$. Given that $\theta_2 = 45°$, tan $\theta_2 = 1$, and thus $K_1/K_2$ is within the desired range of 0.2 to 2. Moreover, $(K_1+K_2)/K_3$ in this third embodiment becomes $(L/K_3) \cdot (\sin \theta_2 + \cos \theta_2)$, which by properly selecting the values of L and $\theta_2$, can be made to be within the range of 1 to 5. Accordingly, all of the desired ranges relating to the values of $K_1$, $K_2$, $K_3$ and $\theta_2$ are satisfied by the third embodiment.

In the third embodiment of the intermittent type swirl injection nozzle of the invention, by properly selecting the tangential angle $\theta_2$ of the outer peripheral face of the swirl chamber 38 relative to the axis of the tangential port 35, the fuel flow from the tangential port 35 in the direction a can be energized in the swirl and straight directions b and c, respectively, as shown in FIG. 5. For instance, the smaller the angle $\theta_2$, that is, the closer the flow from the port 35 is to the axis of the needle valve 33, the weaker is the energization in the swirl direction and the stronger is the energization in the straight direction, and hence the smaller is the angle of divergence of the spray. In contrast to the characteristics above, the larger the angle $\theta_2$, that is, the farther the flow from the port 35 is from the axis of the valve needle 33, the stronger is the energization in the swirl direction and the weaker in the straight direction, and hence the greater is the angle of divergence of the spray. This is the primary difference between the third embodiment and the preceding embodiments; other characteristics are the same as those of preceding embodiments, and hence descriptions thereof will be omitted.

Figure 6:
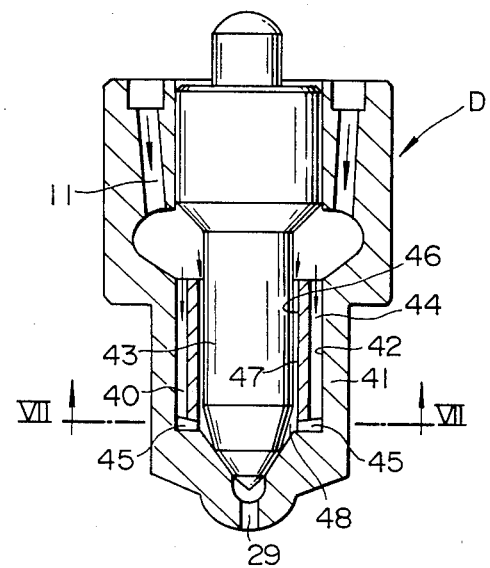
FIGS. 6 and 7 are vertical sectional cutaway and transverse sectional views, respectively, of principal portions of a fourth embodiment of the present invention.
Figure 7:
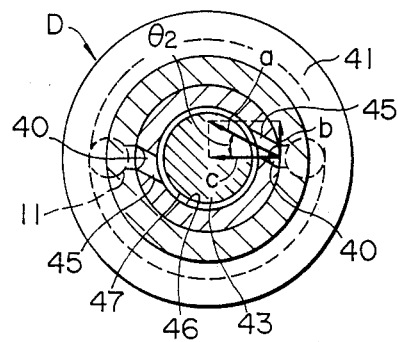

Referring to FIGS. 6 and 7, a fourth embodiment of the intermittent type swirl injection nozzle of the invention will be described. The fourth embodiment of the intermittent type swirl injection nozzle D is provided with a fixed cylindrical member 44, disposed between the inner wall 42 of a nozzle body 41 and a needle valve 43, and at least one notch-shaped tangential groove 45, having a flow area L, at the lower end of the cylindrical member 44. There is also provided a guide hole 46 for slidably guiding the needle valve 43 in the cylindrical member 44 together with an annular straight passage 47 defined between the outer periphery of the needle valve 43 and the inner wall of the guide hole 46. Fuel supply passages 40 communicating with a fuel supply source (not shown) through fuel supply passages 11 is provided between the inner wall 42 of the nozzle body 41 and the outer peripheral wall of the cylindrical member 44. The rear portion of each fuel supply passage 40 is tilted relative to the axis of the needle valve 43, at a tangential angle of $\theta_2$ relative to the outer peripheral face of a swirl chamber 48, and communicates with the tangential groove 45 for energizing the fuel flows around the axis of the valve needle 43 in both the swirl and straight directions.

In this fourth embodiment, the tangential angle $\theta_2$ relative to the outer peripheral face of the swirl chamber 48 should be properly selected and determined. In doing so, the existence of the flow in the straight direction via the passage 47 must be taken into consideration. Accordingly, $\theta_2$ in this case will be relatively large in comparison with the third embodiment. This is the primary difference between this arrangement and those of the preceding embodiments. Other characteristics are the substantially same, and hence a further description will be omitted.

Figure 8:
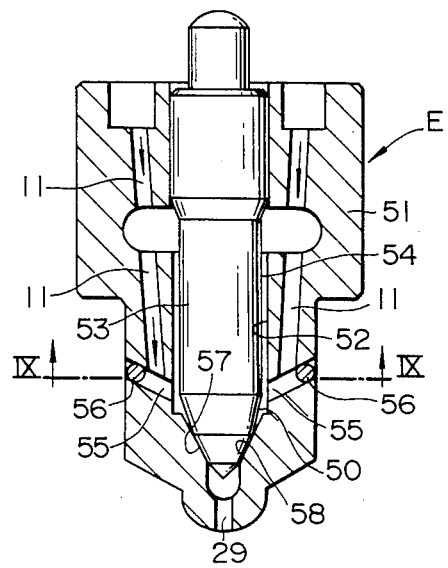
FIGS. 8 and 9 are vertical sectional cutaway and transverse sectional views, respectively, of principal portions of a fifth embodiment of the present invention.
Figure 9:
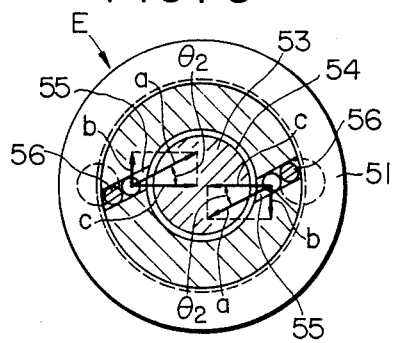

Referring to FIGS. 8 and 9, a fifth embodiment of an intermittent type swirl injection nozzle of the invention will be described. The fifth embodiment of the intermittent type swirl injection nozzle is provided with a needle valve 53 slidably received in a guide hole 52 formed in the base face of a nozzle body 51. In this injection nozzle E, there is provided a clearance passage, namely, a straight passage 54, between the periphery of the needle valve 53 and the inner wall of the guide hole 52. A conical body seat 58 is provided at the leading end of the guide hole 52 where the conical forward end 57 of the needle valve 53 contacts the seat 58, and there is also provided a spray hole 29 opening to the end face of the nozzle body 51 through the conical body seat 58 and having a flow area $K_3$. The nozzle body 51 defines an annular swirl chamber 50 located close to the boundary between the columnar body of the needle valve 53 and the conical forward end thereof. Tangential ports 55 acting as swirl passages are provided extending radially and tangentially from the forward end of the fuel supply passage formed in the base face of the nozzle body 51 and communicating at its inner end with the swirl chamber. At the end of each of the tangential ports 55 is airtightly provided a blocking member 56.

The fifth embodiment of the fuel injection valve is constructed so that, if the pressure of the fuel supplied to the swirl chamber 50 through the fuel supply passages 11 and the tangential ports 55 is raised, the needle valve 53 will be lifted from the body seat 58 in the guide hole 52 against the force of the coil spring and the swirl chamber 50 will be communicated with the spray hole 29 via the gap between the forward end 57 of the needle valve 53 and the body seat 58 in the guide hole 52 to cause the fuel to be sprayed.

In the fifth embodiment of the injection valve, the axis of each of the tangential ports 55 is tilted relative to the axis of the needle valve 53 at a tangential angle $\theta_2$ toward the outer peripheral face of the swirl chamber 50 for energizing the fuel around the axis of the needle valve 53 in both the swirl and straight directions. Furthermore, the axes of the tangential ports 55 can readily be set at the tangential angle $\theta_2$ toward the outer peripheral face of the swirl chamber 50. In determining the angle $\theta_2$, the other flow energized in the straight direction via the straight passage 54 must also be taken into account. In doing so, $\theta_2$ is seen to be relatively large in comparison with the case of the third embodiment. This is the primary difference between the fifth embodiment and the preceding embodiments. As the other characteristics are the same, a further description of the nozzle of the fifth embodiment will be omitted.

Figure 10:
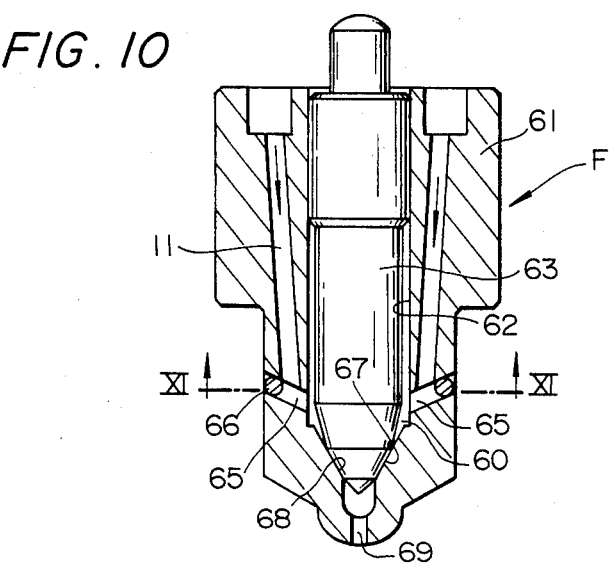
FIGS. 10 and 11 are vertical sectional cutaway and transverse sectional views, respectively, of principal portions of a sixth embodiment of the present invention.
Figure 11:
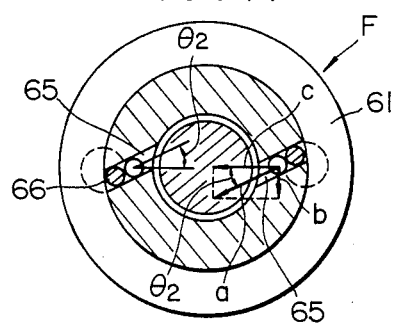

Referring to FIGS. 10 and 11, a sixth embodiment of the intermittent type swirl injection nozzle will be described. The sixth embodiment of the intermittent type swirl injection nozzle F is formed with needle valve 63 slidably disposed in a guide hole 62 formed in a nozzle body 61, and a coil spring resiliently biases the valve needle 63 in the forward direction. There are also provided a conical body seat 68 in contact with the conical forward end 67 of the needle valve 63 at the forward end of the guide hole 62 and a spray hole 69 extending from the body seat 68 opening to the forward end face of the nozzle body 61 and having a predetermined flow area $K_3$. The portion of the nozzle body 61 located around the leading end of the needle valve 63 is formed with an annular swirl chamber 60. The fuel supply passages 11 provided in the wall of the nozzle body 61 extend forwardly and tangentially communicate with the outer portion of the swirl chamber 60 through ports 65, thus defining swirl and straight passages having predetermined flow areas. The longitudinal axes of the port 65 are tilted relative to the axis of the valve needle 63 at a tangential angle $\theta_2$ toward the outer peripheral face of the swirl chamber 60 for energizing the fuel around the axis of the needle valve 63 in the swirl direction. In this sixth embodiment, the tangential angle $\theta_2$ is determined in consideration of the flow influences in both the straight and swirl directions provided by the tangential port 65. This is the primary difference between this arrangement and those of the preceding embodiments. The other characteristics are the same as in the preceding embodiments, and hence a further description thereof will be omitted.

The swirl and straight passages used in the nozzles of the invention are not limited to those of the foregoing preferred embodiments and may have other configurations and include other combinations while yet attaining similar effects. For instance, although, as described above with reference to the first embodiment, a swirl passage is formed in the outer periphery of the fixed cylindrical member, there may be formed a swirl passage 71 in the inner periphery of a cylindrical member 70 and an annular straight passage 77 (having a flow area $K_2$) between a guide hole 76 of the cylindrical member 70 and the lower outer peripheral wall 72 of a needle valve 73 and along the axial direction of the needle valve 73, whereby the same effects as those described above are attained.

Figure 12:
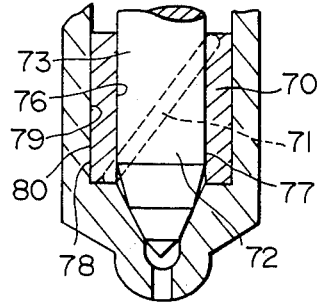
FIG. 12 is a view of a further embodiment of the present invention.

FIG. 12 shows another example of the invention wherein a cylindrical member 70, having a swirl passage formed in its inner wall, is made integral with a valve needle 73 to move together as a unit. A straight passage 80 is formed between the outer wall 78 of the cylindrical member 70 and the inner wall 79 of the nozzle body. In this case, the same effects as those of the aforementioned embodiments are also obtained.

The effects of the swirl injection nozzles of the invention will now be further described in detail.

In the conventional swirl injection nozzle, the swirl flow has been considered only with regard to energization of the fuel flow in the swirl direction. Such a simple concept is, however, insufficient to achieve satisfactory control over the angle of divergence of the spray, the degree of atomization and the penetration of the spray.

However, in the intermittent type swirl injection nozzle according to the present invention, based on the hitherto undiscovered facts that a combination of flows energized in the swirl and straight directions exerts an advantageous influence upon the spray characteristics of the nozzle and that such fuel flows can be created by the choice of construction of the passages, difficulties attributed to the atomization of fuel are effectively obviated by an extremely simple expedient.

Specifically, the effects of the invention include the following:

(1) As set forth above in detail, the intermittent type swirl injection nozzle according to the present invention attains desired spray characteristics simply by appropriate determination of the construction of the fuel passages.

(2) The intermittent type swirl injection nozzle according to the present invention is simple in construction, readily installed, and thus less costly. The structure of the conventional nozzle body need not be modified; it is only necessary to add another cylindrical member to the structure of the conventional nozzle.

The conventional small injection nozzle for direct injection Diesel engine requires plural spray holes, each being 0.3 mm$\phi$ or less in diameter, to control the penetration and the degree of atomization of the fuel, and normally a high pressure pump must be used depending upon the desired spray characteristics. However, in the swirl injection nozzle according to the present invention, a rather large single spray hole and an ordinary pressure pump can be used. Accordingly, the injection nozzle and related components, such as the connecting piping and the pump, can be provided at a lower cost. In many cases, moreover, the cylindrical member, the only additional part to those of the conventional injection nozzle, can be readily formed as a separate lot and easily assembled to the nozzle by setting it in the guide hole of the nozzle body. That is, the inventive nozzle can be readily processed, is uniform in quality and inexpensive, and can be easily mass produced.

(3) The intermittent type swirl injection nozzle according to the present invention is particularly effective for engines of compact motor vehicle and industrial and multipurpose direct-injection Diesel engines, but may be applied as well to large-size Diesel engines. An injection nozzle is normally installed close to the center of the cylinder bore and must be arranged close to the intake and exhaust valves. When the swirl injection nozzle according to the present invention is applied, because the nozzle body is small and its external diameter can be minimized (typically only about 7 mm$\phi$), and since the mass of the needle valve can be reduced compared with the conventional case, the speed of response of the valve needle is improved. Advantages derived therefrom enable the injection nozzle according to the present invention to be applicable to small, direct-injection Diesel engines. The compact intermittent type swirl injection nozzle according to the present invention is further advantageous in that the space needed for installation is reduced.

Furthermore, plural nozzles of this invention can be employed when higher air utilization is needed for the effective combustion of the engine. Even in this case, it is ensured that far more efficient and effective combustion can be attained than in the case of a high pressure multi-hole spray nozzle.

(4) With the intermittent type swirl injection nozzle according to the present invention, any multi-purpose fuel pump operating at normal pressures (valve opening pressure 120 to 180 kg/cm$^2$) can be employed, due primarily to the different spray generation mechanism used by the invention. Moreover, because the arrangement of the swirl and straight passages and the spray hole are taken into account, not only is excellent atomization of the fuel attained at normal pressures, but also good penetration of the spray is made possible. Also, fuel leakage from the connecting pipes and cracking thereof attributed to pressures exceeding 250 kg/cm² (and peak pressures ranging from 500 to 700 kg/cm² or more), damage to the pipes due to erosion and noise derived from vibration and the like are eliminated. As a result, the overall injection system, including the pump, can be provided at a lower cost while attaining extremely high reliability and durability.

(5) With the injection nozzle according to the present invention, various kinds of fuel are usable. Diesel oil having low setane values and wide cut low setane oil can be used due to the advantageous spray characteristics of the injection nozzle of the present invention. It is highly probable, moreover, that low-grade diesel oil, diesel oil blended with heavy oil, diesel oil blended with alcohol, vegetable fuel oil, and the like are usable for Diesel engines when the injection nozzle of the present invention is employed. Thus, the present invention makes a significant contribution to the conservation of energy.

(6) With the intermittent type swirl injection nozzle according to the present invention, satisfactory high speed operation is possible. A conventional swirl injection nozzle is normally capable of better performance than other types injection nozzles for low engine speed ranges but is accompanied by other problems due to the required high pump pressure. However, by arranging swirl and straight passages independent of each other, as in the first and fourth embodiments, the flow energized in the swirl direction hardly affects the fuel flow energization in the straight direction during high-speed, high-pressure operations, thus preventing the spray angle from being undesirably increased. In other words, stable and quiet combustion is provided in the low-speed range because a good swirl flow is produced, whereas a higher rate of air utilization makes possible excellent performance of the engine in the high-speed range.

A number of advantageous effects and characteristics of the intermittent type swirl injection nozzle according to the present invention have so far been discussed. However, still other advantageous effects, which have been sought for several decades, are attained with the invention, including improved atomizing characteristics of fuel supplied to a Diesel engine. Still further, reductions in combustion noise and the production of harmful exhaust substances has also been achieved.

Although the present invention has been discussed with reference to the case of an intermittent type swirl injection nozzle for Diesel engines and the like, the basic concept of the invention is applicable more generally to the injection of liquid from spray holes with a combination of flows energized in swirl and straight directions, and thus the application of the invention is not limited to an intermittent type swirl injection nozzle.

We claim:

1. An intermittent type swirl injection nozzle comprising:
    a nozzle body comprising a guide hole and a bottom portion on which a spray hole and a body seat are formed;
    a fuel supply source for supplying fuel;
    a needle valve slidably inserted and reciprocally moved within said guide hole of said nozzle body, said needle valve having a tip portion for seating on said body seat to open and close said spray hole;
    a swirl chamber formed downstream of said fuel supply source and upstream of said spray hole, said swirl chamber being defined between said nozzle body and said needle valve, and said swirl chamber communicating with said spray hole when said tip portion of said needle valve is not seated on said body seat, and said tip portion of said needle valve being located downstream of said swirl chamber when said tip portion is seated on said body seat;
    a swirl passage connected to said swirl chamber and provided around a longitudinal axis of said needle valve for giving a swirl flow influence around said axis of said needle valve to fuel flowing when said needle valve is lifted from said body seat to open said spray hole;
    a straight passage connected to said swirl chamber and provided between said nozzle body and said needle valve in a region where they slidably contact for giving the fuel a straight flow influence in an axial direction of said needle valve;
    inlet means, provided downstream of said fuel supply source and upstream of said swirl chamber, for communicating said fuel supply source with said straight passage and said swirl passage; and
    means (4) for separating said straight passage from said swirl passage and preventing the fuel having the swirl flow influence from mixing with the fuel having the straight flow influence before entering said swirl chamber, said separating means being disposed between said nozzle body and said needle valve,
    wherein said swirl and straight passages satisfy at least one of the following conditions:
    (1) the sum of first and second effective flow areas ($K_1 + K_2$) of said swirl and straight passages relative to a third effective flow area ($K_3$) of said spray hole is within a range of 1 to 5;
    (2) the first effective flow area ($K_1$) of said swirl passage relative to the second effective flow area ($K_2$) of said straight passage is within a range of 0.2 to 2;
    (3) the angle ($\phi_1$) of said swirl passage relative to the axis of said needle valve is within a range of 5° to 60°; and
    (4) the fuel pressure ($P_2$) in said swirl chamber relative to the fuel pressure ($P_1$) at said inlet means is within a range of 0.4 to 0.95,
    and wherein said swirl passage is defined between said separating means and an inner surface of said nozzle body which faces said needle valve, and said straight passage is defined between said needle valve and said separating means.

* * * * *